United States Patent
Baentsch et al.

(10) Patent No.: US 9,760,729 B2
(45) Date of Patent: Sep. 12, 2017

(54) METHOD, SECURE DEVICE, SYSTEM AND COMPUTER PROGRAM PRODUCT FOR SECURELY MANAGING USER ACCESS TO A FILE SYSTEM

(71) Applicant: INTERNATIONAL BUSINESS MACHINES CORPORATION, Armonk, NY (US)

(72) Inventors: Michael Baentsch, Gross (CH); Harold D Dykeman, Richterswil (CH); Reto J Hermann, Buttikon (CH); Thorsten Kramp, Kilchberg (CH); Michael P Kuyper-Hammond, Kaltbrunn (CH); Michael C Osborne, Richterswil (CH); Thomas D Weigold, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/724,131

(22) Filed: May 28, 2015

(65) Prior Publication Data

US 2015/0286837 A1    Oct. 8, 2015

Related U.S. Application Data

(63) Continuation of application No. 13/881,735, filed as application No. PCT/IB2011/054615 on Oct. 18, 2011, now Pat. No. 9,152,815.

(30) Foreign Application Priority Data

Oct. 29, 2010    (EP) .................................... 10189463

(51) Int. Cl.
    *G06F 21/62*    (2013.01)

(52) U.S. Cl.
    CPC .. *G06F 21/6218* (2013.01); *G06F 2221/2141* (2013.01); *G06F 2221/2153* (2013.01)

(58) Field of Classification Search
    USPC .......... 726/29, 2, 21, 36; 713/150, 163, 181; 380/255, 264, 276
    See application file for complete search history.

(56) References Cited

U.S. PATENT DOCUMENTS 6,484,143 B1    11/2002    Swildens et al.
6,751,677 B1    6/2004    Illnicki et al.
(Continued)

FOREIGN PATENT DOCUMENTS

CN    1795439 A    6/2006
EP    1089156 A2    4/2001
(Continued)

OTHER PUBLICATIONS

Weigold et al."The Zurich Trusted Information Channel—An Efficient Defence Against Man-in-the-Middle and Malicious Software Attacks" 1st Intnl Conf. on Trust in IT, 2008,p. 75-91.

*Primary Examiner* — Farid Homayounmehr
*Assistant Examiner* — Sharif E Ullah
(74) *Attorney, Agent, or Firm* — Griffiths & Seaton PLLC (57) ABSTRACT

A method, a secure device, a system and a computer program product for securely managing user access to a file system. The method includes providing a secure device, where the secure device is protected by design against malicious software or malware and adapted to establish a connection to a server through a telecommunication network establishing a connection between the secure device and the server, receiving at the secure device, through the established connection, data pertaining to a file system identifying files which are at least partly stored outside the secure device, exposing at the secure device the file system to a (Continued)

user, based on the data received from the server, the file system navigable by the user.

17 Claims, 4 Drawing Sheets (56) References Cited

U.S. PATENT DOCUMENTS

| | | |
|---|---|---|
| 2002/0029263 A1 | 3/2002 | Toyoshima et al. |
| 2003/0110397 A1 | 6/2003 | Supramanium et al. |
| 2004/0177166 A1 | 9/2004 | Ellison et al. |
| 2005/0005133 A1 | 1/2005 | Xia et al. |
| 2005/0273486 A1 | 12/2005 | Keith, Jr. |
| 2006/0236100 A1 | 10/2006 | Baskaran et al. |
| 2008/0134347 A1* | 6/2008 | Goyal ................. G06F 21/6209 726/29 |
| 2008/0229428 A1* | 9/2008 | Camiel ............. G06F 17/30082 726/27 |
| 2009/0007223 A1 | 1/2009 | Centonze et al. |
| 2011/0247057 A1 | 10/2011 | Baentsch et al. |

FOREIGN PATENT DOCUMENTS

| | | |
|---|---|---|
| GB | 2462442 A | 2/2010 |
| WO | WO 99/60458 A2 | 11/1999 |
| WO | WO 2004099940 * | 1/2004 |
| WO | WO 2004/092931 A2 | 10/2004 |
| WO | WO-2004-099940 A2 | 11/2004 |
| WO | WO 2006/070330 A1 | 7/2006 |

* cited by examiner

METHOD, SECURE DEVICE, SYSTEM AND COMPUTER PROGRAM PRODUCT FOR SECURELY MANAGING USER ACCESS TO A FILE SYSTEM

CROSS-REFERENCE TO RELATED APPLICATION

This application is a continuation of U.S. patent application Ser. No. 13/881,735 filed Jul. 12, 2013, which is a National Phase Application based on PCT/IB2011/054615 filed Oct. 18, 2011, which claims priority from European Patent Application No. 10189463.2 filed Oct. 29, 2010, the entire contents of each which are incorporated herein by reference.

FIELD OF THE INVENTION

The invention relates to a method using a secure device for securely managing user access to a file system. In particular, it relates to a method using a secure device protected by design against malicious software or malware and adapted to establish a connection to a server, e.g., a secure connection such as an SSL/TLS connection. Consistently, the invention relates to such a device, as well as a system comprising such a device or a computer program medium for implementing the said method and corresponding server components.

BACKGROUND OF THE INVENTION

Security problems with PCs make them unsuitable for many functions since data entered by users can be manipulated or copied by an attacker. For example, transactions can be changed to send money to unwanted recipients or to order unwanted goods, or user credentials can be copied providing attackers with access to systems such as those used for Internet banking.

To solve some of these problems, a user secure device (also a "trusted device") can be used together with a PC. One such solution, the IBM Zone Trusted Information Channel (see Thomas Weigold, Thorsten Kramp, Reto Hermann, Frank Höring, Peter Buhler, Michael Baentsch, "The Zurich Trusted Information Channel—An Efficient Defence against Man-in-the-Middle and Malicious Software Attacks", In P. Lipp, A.-R. Sadeghi, and K.-M. Koch (Eds.): TRUST 2008, LNCS 4968, pp. 75-91, 2008), allows the user to verify information associated with a transaction (e.g., in the case of Internet banking the amount and recipient) before the transaction is executed by the service provider (e.g., the bank). The transaction is verified on the device, which is secure and can send the verified information to the back-end system in a secure manner.

Besides, given the availability of low-cost, high-capacity USB flash drives, secure document management has become an area of concern for any IT organization. There are notably two problems:

1. External data loss: large amounts of sensitive data can easily be stored and transported on devices such as USB flash drives. The loss of such a device can create a legal or financial exposure for a company.

2. Employee data theft: sensitive data can easily be stolen by employees who have access thereto via a PC.

Solutions are now emerging on the market for the first problem. For instance, data on USB drives can be encrypted and password protected. Similar to other IT systems, if a wrong password is entered more than a specified number of times, then the devices lock, thereby making the data inaccessible.

The second problem can be addressed by blocking, within a company, USB ports for mass-storage devices. Unfortunately, such solutions also prevent many legitimate and useful applications of portable storage devices.

Another approach is to use monitoring software on the user's PC in order to detect and prevent data copying that violates given policies. However such software solutions are only as secure as the system and application software used to implement it, i.e., in the presence of a determined attacker, they cannot solve the problem.

A related challenge is the secure distribution of sensitive documents. A document can be encrypted prior to distribution, which protects the documents while it is in transit and once it is stored on a user's PC, assuming it is stored in an encrypted form. However, as soon as the document is decrypted, for example for viewing, it is exposed, whence a risk. Inside of a company, the risk is limited by the overall security of the company's IT infrastructure that is used to process (e.g., view or print) the documents. Yet, when such a document is decrypted outside of a company, e.g., on a PC with Internet connectivity, or when the security of a company PC is compromised, such document is once more exposed.

There is a need for improving current methods for secure distribution of sensitive documents and more generally, for securely managing user access to files.

BRIEF SUMMARY OF THE INVENTION

According to a first aspect thereof, the present invention provides a method for securely managing user access to a file system, comprising the steps of: providing a secure device, the latter protected by design against malicious software or malware and adapted to establish a connection to a server, through a telecommunication network; establishing a connection between the secure device and the server, preferably via a host connected to the server; receiving at the secure device, through the established connection, data pertaining to a file system identifying files which preferably are at least partly stored outside the secure device; exposing at the secure device the file system to a user, based on the data received from the server, the file system navigable by the user.

In embodiments, the method may comprise one or more of the following features:

the method of the invention further comprises a step of: after receiving at the device a request for accessing an external file identified in the exposed file system and stored outside the secure device, receiving at the secure device said external file through a connection established between the secure device and the server, for subsequent storage on the secure device;

the method of the invention further comprises the steps of: receiving at the secure device, through the established connection, updated data pertaining to an updated file system identifying files which preferably are at least partly stored outside the secure device; exposing at the secure device the updated file system to a user, based on the updated data received from the server, the updated file system navigable by the user, wherein, a file stored on a memory of the secure device, which is identified in a previously exposed file system and not identified in the updated file system is preferably removed from the memory of the secure device;

data pertaining to a file system as received at the secure device and the corresponding file system are user specific;

a step of receiving data further comprises receiving data corresponding to one or more files identified in the corresponding file system;

files identified in a file system as exposed at the secure device are stored on several servers, said file system as exposed being seamlessly navigable by the user;

the method of the invention further comprises a step of: after receiving a request for using an internal file, identified in the exposed file system and stored on the secure device, processing the user request at the secure device according to an updated use permission associated to the internal file, wherein the updated use permission is obtained at the secure device by updating a use permission based on permission data sent from the server through a connection established between the secure device and the server;

the method of the invention further comprises, after receiving the request for using the internal file, a step of: updating a use permission associated to the internal file upon granting the request for using the internal file;

updating a use permission associated to the internal file is carried out at the secure device;

the method of the invention further comprises, after updating a use permission associated to the internal file, a step of instructing at the secure device to expose the internal file to a user interface or an application, according to said updated use permission;

an updated use permission comprises a parameter, such as the number of times that the associated file can be accessed or the time during which it can be accessed, which parameter restricts access rights to the file when interpreted by the device processing a request for using the file; and a connection established between the secure device and the server is a secure connection, such as an SSL/TLS connection.

According to another aspect, the invention is embodied as a secure device protected by design against malicious software or malware and having processing means, a memory and interfaces, configured to couple to or interact with: a user; one or more servers, and preferably a host, such as a personal computer or PC, the secure device adapted to establish a connection such as a TLS/SSL connection with a server, preferably via a host, when the secure device is connected to the server through a telecommunication network, and further comprising a computerized method stored on the memory and executable by the processing means for implementing the steps of the method of the invention.

According to a further aspect, the invention is embodied as a system comprising: the secure device according to the invention; a personal computer or PC; and one or more servers.

According to a final aspect, the invention is embodied as a computer program medium comprising instructions executable by processing means for executing all the steps of the method according to the invention.

Methods, devices and systems embodying the present invention will now be described, by way of non-limiting examples, and in reference to the accompanying drawings.

BRIEF DESCRIPTION OF SEVERAL VIEWS OF THE DRAWINGS

FIGS. 4 and 5 illustrate such data structures before and after updating use permissions at the device, respectively.

DETAILED DESCRIPTION OF THE INVENTION

As an introduction to the following description, it is first pointed at a general aspect of the invention, directed to a secure management of user access to a virtual file system. The method makes use of a user secure (or trusted) device, such as a USB flash drive. The latter is yet protected by design against malicious software or malware. It is furthermore adapted to establish a connection, e.g., an SSL/TLS connection, to a server and preferably via a host connected to the server (and this, through a network, e.g., Internet). The secure device may accordingly receive data pertaining to a file system (like a file tree). Said file system identifies files, some of which are actually stored outside the secure device, hence defining a virtual file system. Next, the device exposes the file system to the user, based on the received data. The file system is exposed in a form navigable by the user, i.e., the user can request access to files identified in the file system. Since the file system originates from the server and is navigated from the secure device, a method is accordingly obtained which allows for securely managing user access to the virtual file system.

In particular, the file system can be made user specific or be updated according to server policies, thereby improving the security. The corresponding files can e.g., be obtained from the server together with the file system, e.g., if the required version of the file is not already stored on the device. Thus, files stored outside the device can be fetched upon user request, through a connection established with the server. This way, the secure device effectively becomes a secure cache for the server whose content can change both in response to user interactions or server decisions.

Advantageously, when receiving a request for using a file stored on the device, the device may process the request according to a use permission associated to the file. "Processing" such a request here typically means: grant the request if possible (based on use permissions) and subsequently take steps to execute the request (e.g., starting with decrypting the file, if the latter is stored in an encrypted state). The use permission is subsequently updated, if necessary (i.e., depending on the type of permissions involved and whether the request has been granted). A permission used to process the request is obtained in the first place based on data sent from the server. Accordingly, when receiving a request for using a file (that is, an access request, e.g., view or print the file), the device is able to process the request according to an updated (as possible) state of the corresponding permission, e.g., in accordance with given server (i.e., company) policies. Therefore, it is possible to restrict the use of files made available through the virtual file system.

Figure 1:
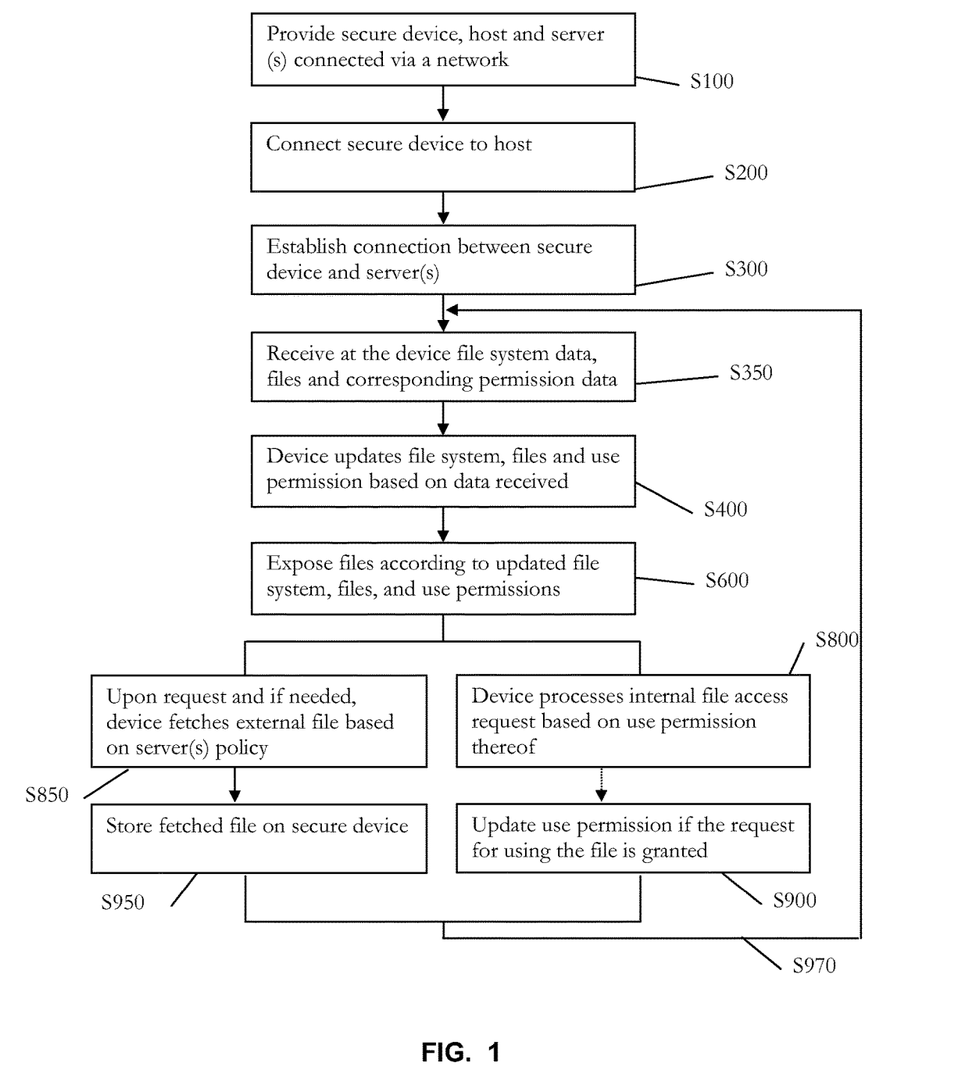
FIG. 1 is a flowchart depicting steps of a general embodiment of the method according to the invention.
Figure 3:
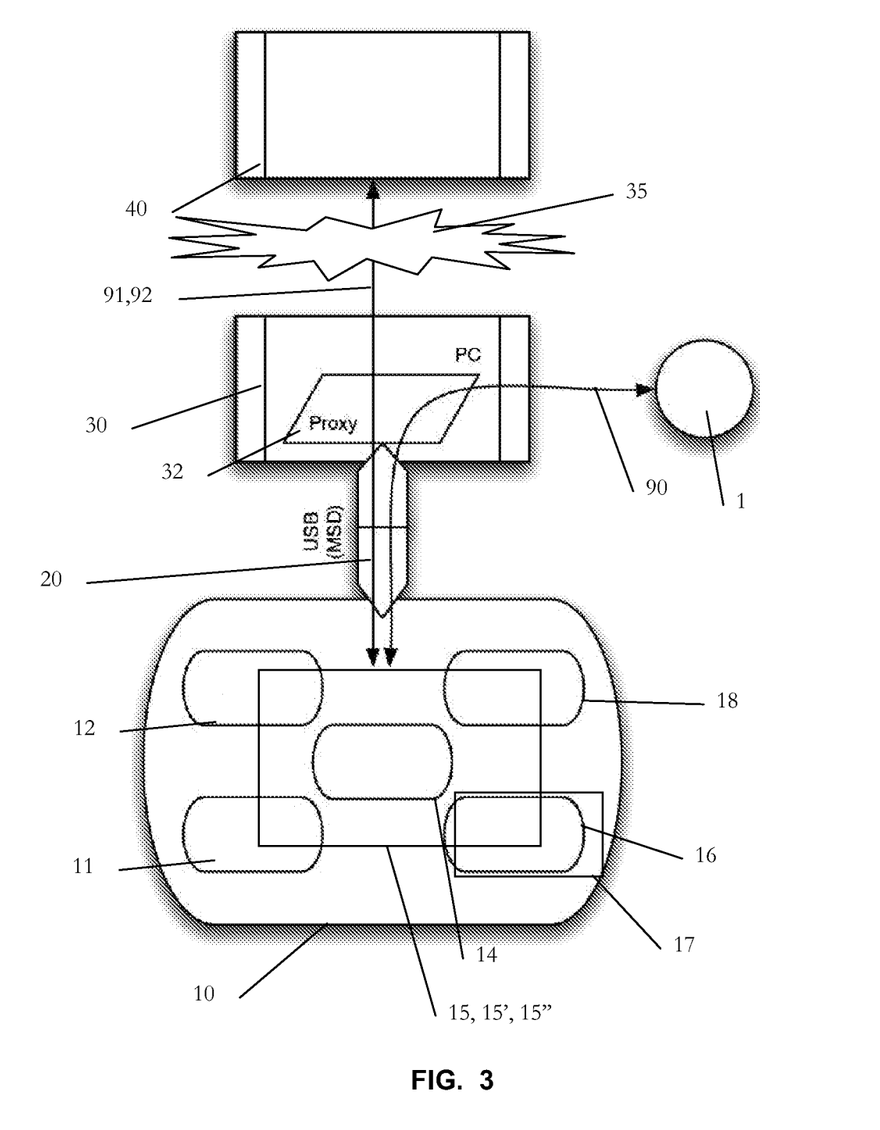
FIG. 3 is a schematic representation of a secure device coupled to a terminal and a server, arranged according to an embodiment of the invention, and allowing for securely managing file use.

More in details, FIG. 1 depicts a flowchart illustrating a general embodiment of the method. FIG. 3 is a schematic representation of an example of secure device coupled to a terminal and a server via a network.

Referring to FIGS. 1 and 3 altogether: the invention relies first and foremost on a secure device 10 (step S100). As said, the latter is protected by design against malicious software or malware. For example, the secure device may be deprived from some client interfaces for software installation or other functions that would expose it to a malware. However, the device is typically provided with simple user input and output capabilities for entering and reviewing user security elements, e.g., PINs or smart cards.

The device is adapted to establish a connection 91, e.g., a secure connection such as a mutually authenticated connection to a server and/or any suitable source 40. The secure device could have its own ability to communicate directly with said server, without passing through a host. In that case, the device may be provided with a WLAN or GSM adapter built-in. However, in preferred embodiments, the device connects to the server via a host 30 of the telecommunication network 35, such as the Internet network, which solution is likely more convenient in terms of ergonomics for the user. The host is preferably a PC connected to the network. The terminal can also be any other suitable source such as a personal digital assistant or PDA or mobile phone. A suitable type of secure connection to a server is for example a TLS/SSL connection.

Besides, the secure device is provided with a computerized method stored in its memory for executing steps of the method described hereinafter.

Preferred features of this device are depicted in FIG. 3. Typically, the secure device 10 has processing means (or computing means) 15 coupled to a memory, which typically comprises both persistent and non-persistent memories 15' and 15". The persistent memory stores e.g., the computerized method evoked above, to be executed by the said processing means.

In addition, the device is further provided with at least one interface 20, e.g., a USB interface, for communicating with the host of the network 35, e.g., the PC 30. In embodiments, the same interface 20 (or another type of interface) shall furthermore allow the secure device to communicate with an external device such as a beamer, a printer, a secure PC (e.g., one that is only used for viewing sensitive material and never connected to a network) or any other output device (not shown).

If necessary, the secure device has a card reader 17 to read user credentials stored on an external security or memory card 16, e.g., a smart card. Suitable use can safely be made out of such data, e.g., user credentials as stored on the card. In particular, a trustworthy connection can be established between a user 1 (or strictly speaking the device 10) and a third party (e.g., the server 40) via the terminal 30, using such data. In a variant, the user credentials may be stored directly on the persistent memory of the secure device.

Further interfaces (like control buttons 18 and display 12) allow for direct interaction with the user.

In practice, a first step is to connect (step S200) the secure device 10 to a suitable host 30 of the network 35. For the sake of illustration, it is hereafter considered that the host is a PC connectable to a server 40 through the Internet network 35.

The device 10 can then invoke a computerized method stored thereon to trigger a trustworthy connection to the server 40, step S300. For instance, it may establish a secure communication 91 with the server over a non-secure connection 92 via the terminal 30 (e.g., upon unlocking the card).

Preferably, the device is authenticated to the server while initiating the communication 91 over the non-secure connection 92, e.g., by initiating a SSL/TLS authentication to the server, using user credentials as stored on the card or on the internal memory of the secure device. In this regard, setting the device in communication with the server may advantageously comprise starting, from the device, a proxy client residing at the terminal, in order for the device to connect to the server, via the terminal (note that the proxy may possibly reside on the device too, in which case it would be copied to the host PC 30 to be executed). The proxy relays bits received from the device to the internet and vice versa. Authenticating the device to the server can be achieved, e.g., bi-directionally, by initiating from the device the SSL/TLS authentication to the server.

In this respect, the memory 15' may further have stored thereon a security software stack, including cryptographic algorithms, such as a TLS engine 14 for the SSL/TLS authentication. It may further store a USB management software (implementing a USB mass storage device or MSD profile 20), and possibly a pre-loaded networking proxy, as evoked above. As said, user credentials can be stored on the external security card (e.g., a smart card 16), such as client-server certificates (e.g., X.509) enabling TLS-client authentication. The smart card may hold sensitive personal information and have encryption means. In variants, the card cannot encrypt but is used to sign sensitive operations, if any. In still other variants, the card is used for both encryption and signing operations. The device is preferably equipped with a standard smart card reader 17. Finally, the device has control buttons 18 (e.g., OK, Cancel, etc. selectors) and display 12, for displaying information. It may further be provided with means for entering PIN data (e.g., buttons, a rotary wheel, a PINpad/keyboard, etc.).

Thus, in an embodiment, an SSL/TLS channel is established between the server and the device (step S300). Although other types of secure connections can more generally be contemplated, a mutually authenticated connection such as an SSL/TLS connection is assumed in the following.

In a subsequent step, S350, data pertaining to the virtual file system are sent from the server through the established connection, e.g., through the mutually authenticated connection 91 established, as evoked above. Said data are received at the device. The corresponding file system identifies various files, including files which are stored outside the secure device. The file system data may for instance include object identifiers (or file identifiers) together with data representing relations (e.g. hierarchical relations) between said files, such as to make it possible for the secure device to subsequently rebuild a file system navigable by the user, by way of its operating system (as known per se). Note that the file system is said to be "virtual" inasmuch as some of the files reside outside the secure device.

The device may then accordingly expose the virtual file system, step S600, in a form suitable for user navigation, e.g., by using the display and buttons built-in to the device. The user is therefore allowed to navigate amongst files of the virtual file system and possibly select one of them, thereby somehow requesting access to that file (as known from file system navigation in general).

Preferably, permission data are sent together with the file system data and received at the device, at step S350. In variants, such permission data might however be sent before, after, or made available to the secure device by way of any suitable algorithm. They represent use permissions associated to one or more files. Contents of some of the corresponding files may be sent altogether. Yet the file system, files and permission data may be sent at different times. Accordingly, some of the files are stored on the device at some point (e.g., they were sent earlier or were obtained from an independent source, e.g., from a smart card or manually entered via the built-in buttons), while some of the files can be obtained at a later stage, if necessary. Permission data may for instance include object identifiers too, together with corresponding information as to the extent of the use rights. Since some of the files may be stored outside the secure device, not all of said object identifiers need to correspond to objects stored on the secure device. The device is able to retrieve what use permission is associated to what file when queried thereabout (a unique identifier formalism may be used in that respect).

The embodiments described next assume that use is made of permission data associated to part or all of the files of the virtual file system, although permission data as such are not mandatory for implementing all embodiments of the present invention. Furthermore, for the purpose of the following description, one assumes that at least one file is stored on the secure device at some point and that permission data received at the device contain data pertaining to that file. The permission data may for instance consist of at least one cardinality associated to a file identifier. More cardinalities may be involved, each associated to one type of action. More shall be said later in reference to FIGS. 4 and 5.

In the embodiment of FIG. 1, the file system data, file data and permission data received are stored on a memory of the device (not necessarily a persistent memory thereof). The received data may for instance be stored in replacement of older data. The received data may also be a delta file, indicating changes with respect to older data; the device then suitably updates the data. Yet, in one way or another, the device is made aware (step S400) of updated data pertaining to the virtual file system, permissions and corresponding files stored or to be stored thereon. The device accordingly maintains data related to the virtual file system. Updating data is generally known per se.

Next, upon receiving a request for accessing a file, the device may process said request according to a current state of the server policy, the file system or the file itself (stored on the device or not), and/or use permission associated to that file (step S700) or to a directory containing this file. Indeed, directories list the names of files logically contained within them. Use permissions for such directories may advantageously be relied upon, which would basically result in limiting the visibility of the files they contain, i.e., rendering files within a directory with insufficient use permissions not only inaccessible but also invisible to the PC and thereby, any possible malware.

Note that in variants to the embodiment of FIG. 1, the device would attempt to connect to the server upon receiving the request for using the file, such that the steps S200-S400 could actually be carried out after receiving a user request for using the file, e.g. via the built-in buttons.

In all cases yet, upon receiving a request for using a file, the secure device shall process the request according to a most recent version of the file system, file, and/or use permission available. We may assume, for the sake of description, that some version of said data (ideally the most up-to-date version) is obtained by connecting to the server and obtaining relevant data therefrom.

Next, concerning the types of requests: a request for accessing a file may for example simply be a request to view contents of the file. Other requests might further imply to print a file, execute it, etc. Examples are given later.

Two cases are to be distinguished.

In a first case, a file selected by the user is not stored on the device (i.e., external file), steps 850-950. There, the device would receive the external file (step S850), through a connection 91 established with the server 40. Preferably, the device instructs to fetch the external file. The file can subsequently be stored on the secure device, step S950. Whether and how to fetch such a file can be made in accordance with a server policy. The device may for instance attempt to fetch a desired file from the server and the latter accepts or refuses based on a policy (access rights, momentary intermission, etc.). In a variant, the transmitted file system is made user specific (e.g., based again on a given policy), such that all files identified therein are a priori available to that user. In other variants, whether to process the user request, i.e., instructing to fetch a requested file can be decided locally at the device, based on some suitable algorithm, available at the device. Interestingly, whether to fetch a file may further be decided based on permissions associated to the file. Thus one understands that "file permissions" and "server policy" may, in embodiments, overlap or, even, be one and a same thing, e.g., technically embodied as sets of numbers associated to files of the file system.

In the second case, the file selected by the user is already stored on the device (internal file), steps 800-900. There, how to process the user request is made according to permissions associated to that file. For example, if the use permission allows, said contents are displayed e.g., on a display 12 of the secure device 10. This is practical as long as the size of the document does not prohibit it. In other cases, the device may for instance need to be set in communication with an external output device to complete the request. The request may be received from an external application, e.g., that requests to copy a file (or to communicate contents thereof) e.g., for subsequent display or printing. How to communicate contents of the files to an external device is known per se.

For example, the secure device can be configured to be connectable to a beamer (e.g., a display device with no "computing" capability, i.e., which can not be exposed to malware), using for instance secure Bluetooth pairing (SSP). As another example, the secure device is connectable to a printer, using a USB cable or secure Bluetooth pairing (SSP). This allows a document to be printed directly from the secure device. This is especially useful if the document at stake is not allowed to be printed via the user's PC (due to its associated use permission). Thus, the external output device may typically be a printer or a beamer. Yet, it may also be a PDA or the PC 30 itself (to which the device is likely already connected), for which the use permission is likely more stringent than for a beamer or printer, depending on the company policy. Note that, in embodiments, a printer or beamer can part of the secure device itself.

Preferably, if the use request is granted by the device, a use permission associated to the file is updated (step S900).

According to a variant, updating the use permission after granting a request (step S900) is preferably carried out directly at the device (typically, a cardinality is decremented). Corresponding data shall nonetheless be sent to the server, which consistently updates use permission as maintained on the server side. This way, the device maintains up-to-date use permissions. Thus, the device can still process another request for the same file, even if a subsequent attempt to obtain updated permissions from the server fails (or existing permissions do not mandate obtaining updated permissions, e.g., to allow offline use). In this variant, a concurrent update mechanism is typically implemented both at the server and at the secure device. Reconciliation is however needed at some point. Several possibilities exist to reconcile the permissions (several algorithms for synchronizing two database instances are known). The device may for instance periodically attempt to connect to the server and get updated permission data, or attempt to connect upon starting, authenticating the user, or upon receiving another file use request, etc. In any case, permissions as received from the server would likely, when available, supersede local permission. However, without server connectivity, the device preferably updates local permissions, possibly rendering access to files impossible if the use permission cardinalities are reduced to naught.

Now, according to another variant, upon processing a file use request, the device informs the server accordingly, e.g., in cases where the request was granted according to permissions available on the device. The server shall accordingly be able to update use permissions. When the device later connects to the server (e.g., upon receiving another request for using a file), up-to-date permissions are sent to the device for subsequent processing (in addition to updated file system and file data, if necessary). In this case, it is not mandatory to update the permission directly at the device after granting a request, as the device may instead systematically rely on permissions as received from the server. The device may for instance periodically attempt to connect to the server, or attempt to connect upon starting, authenticating the user, or attempt to connect each time another file use request is received, etc. There, permissions as received from the server would supersede a previous version. However, in this variant, the device is strongly dependent on the availability of server connections. For instance, the device may attempt to connect to the server each time it receives a request for using an internal file. Yet, if an attempt to reach the server fails, a request cannot be processed based on most up-to-date permission data. Several fallback algorithms may thus be contemplated as to how to proceed in case newer permissions cannot be reached. One solution consists of refusing the request. Another solution is to rely on a previous version of permission data (i.e., as updated in the last place). Intermediate solutions are of course possible.

Thus, several mechanisms can be invoked for maintaining updated permissions, which ranges from a full centralized solution (only the server updates a permission after granting a request) to concurrent solutions (the device locally updates permissions upon granting a request for using a file and accordingly informs the server). What suitable mechanism to implement may actually depend on a security policy. A different solution could also be defined for each file.

Incidentally, requests for using the files are preferably logged by the device and can be logged additionally at the server, for the purpose of audit or passive security.

As said, the files may be obtained from the server as well (in addition to their associated permissions and a file tree). In variants (not preferred), the file may be obtained from the user's PC or from a remote terminal connected to the network. In embodiments, a desired file is first sent from the terminal to the server, and then sent from the server to the device, which improves security and/or control of the files to be distributed. As noted earlier, the associated permissions may be sent altogether, before or after sending the files.

In embodiments, files stored on the device are encrypted according to a given encryption scheme. The file can be encrypted by the device itself. For example, the secure device is provided with an encryption key stored in an internal memory thereof (not externally accessible) or on a smart card inserted therein. In a variant, the file is transferred to the device in an encrypted state (and this independently from the encryption inherent to the secure connection, if any), such that it shall in fine be stored on the device in an encrypted state. In both cases, a decryption key can be sent from the server to the device, or entered manually by the user on the device, for decrypting the file, e.g., at a later stage and upon request. Incidentally, we note that a permission control mechanism can be implemented with respect to decryption keys as well, just as for the files.

Finally, as apparent from FIG. 1 steps S350-S950 (or even S300-S950 or S200-S950) can be repeated as needed, e.g., each time a new file system, file or permission data are sent to the secure device.

In particular, using the secure device for the first time (first usage scenario), the following series of steps would preferably occur:

1. The user authenticates to the secure device;
2. Once the secure device has established an SSL/TLS connection to its server and identified itself and the user, the server transmits a file structure (a file tree is assumed hereafter) for the corresponding user. Since the secure device is used for the first time, files are cached on the secure device based on a policy configured on the server (there have not yet been any user requests to determine the cache contents) and the device's storage capacity; so, the whole or parts of the server's file tree might be used.
3. The file tree is shown to the user on the secure device; those files for which a local copy is available on the secure device are preferably marked as such (i.e., visually identified to the user), for example by a green check mark icon overlay.
4. When the user accesses a file not locally available on the secure device, the latter fetches the file from the server and stores it. If no more memory is available, then e.g., the file that has not been used for the longest period is removed from the secure device. As an additional policy example the user can be given the option to mark files as "non removable" from the cache.
5. Once a file is locally available on the secure device, the user may access it, possibly subject to use permission as described above.

Next, at a later stage (subsequent usage scenario), the step 2 above would change as follows:

2. Once the secure device has established an SSL/TLS connection to its server and identified itself, the server transmits a file tree for the corresponding user. Here, some of the files are already cached on the secure device. Depending on the server settings, the secure device may replace its current file tree by the server-provided file tree and remove any files from its cache that are no longer present in the new file tree.

Note that if the secure device cannot connect to the server, it may enter an offline mode in which it provides access only to those files that are currently cached, and this, subject to use permission as outlined earlier.

The above scheme and variants thereof can be enhanced by the following features:

- As said, file access can be reported to the server for auditing or statistics purposes, non-repudiation, or still, to trigger file operations as described below.
- As evoked above, the server may immediately send the documents together with the file tree or solely send a list of documents to cache to the secure device. Associated permissions may be sent together with a list or with the documents themselves. If only a list is sent, the secure device may load the files according to a given strategy (e.g., blocking or asynchronously).

For each file, multiple versions (revisions) may be cached. For which documents multiple revisions are to be cached can be decided either at the secure device (e.g., according to a list provided by the server beforehand or derived from usage patterns in the past), or dynamically by the server if the secure device reports file accesses.

Once a user accesses a document on the secure device, certain related documents may be cached. Again, which documents to cache can be decided either by the secure device (e.g., according to a list provided by the server beforehand or derived from usage patterns in the past), or dynamically by the server if the secure device reports file accesses.

Similarly, which documents to remove from the cache can be either decided by the secure device (e.g., according to file sets preconfigured by the server or based on usage patterns in the past), or dynamically by the server if the secure device reports file accesses.

The file tree may be sent partially from the server to the secure device and completed on demand.

Files that are larger than the memory available on the secure device may be split dynamically by fetching the file from the server piece by piece when accessed.

For security reasons, the server can indicate to the secure device that a document must not be cached such that it is never stored on a persistent memory of the secure device.

For security reasons, the server can indicate to the secure device that a document might be cached but must not be readable in offline mode, e.g. via corresponding permission data. In other words, the document can only be read while the secure device is connected to the server (online).

The memory of the secure device might be completely "disabled", in that sense that files are always downloaded from the server on demand and no files are cached locally.

The secure device can be configured to be in contact with several servers and can obtain data from them, thus effectively creating a seamless view into a "cloud" of servers for which the device has been configured. The user can accordingly navigate amongst files of a virtual file system in a seamless manner.

The configuration of such servers could either be controlled statically (at device issuance) or could be updated by a set of specifically designated "cloud control" servers (giving the specific device more or less access to data within the set of servers within the cloud).

It may nonetheless be made possible for documents downloaded to the device (from a server once used within the cloud) to stay within the device even after the association to the server has been deleted by the "cloud control" servers. This way, the device effectively becomes a secure data carrier in its own right or a member of the original cloud (from the perspective of document management; it is for instance now possible to exchange documents between clouds just by temporarily joining one cloud with the same device and then joining another one).

Figure 2:
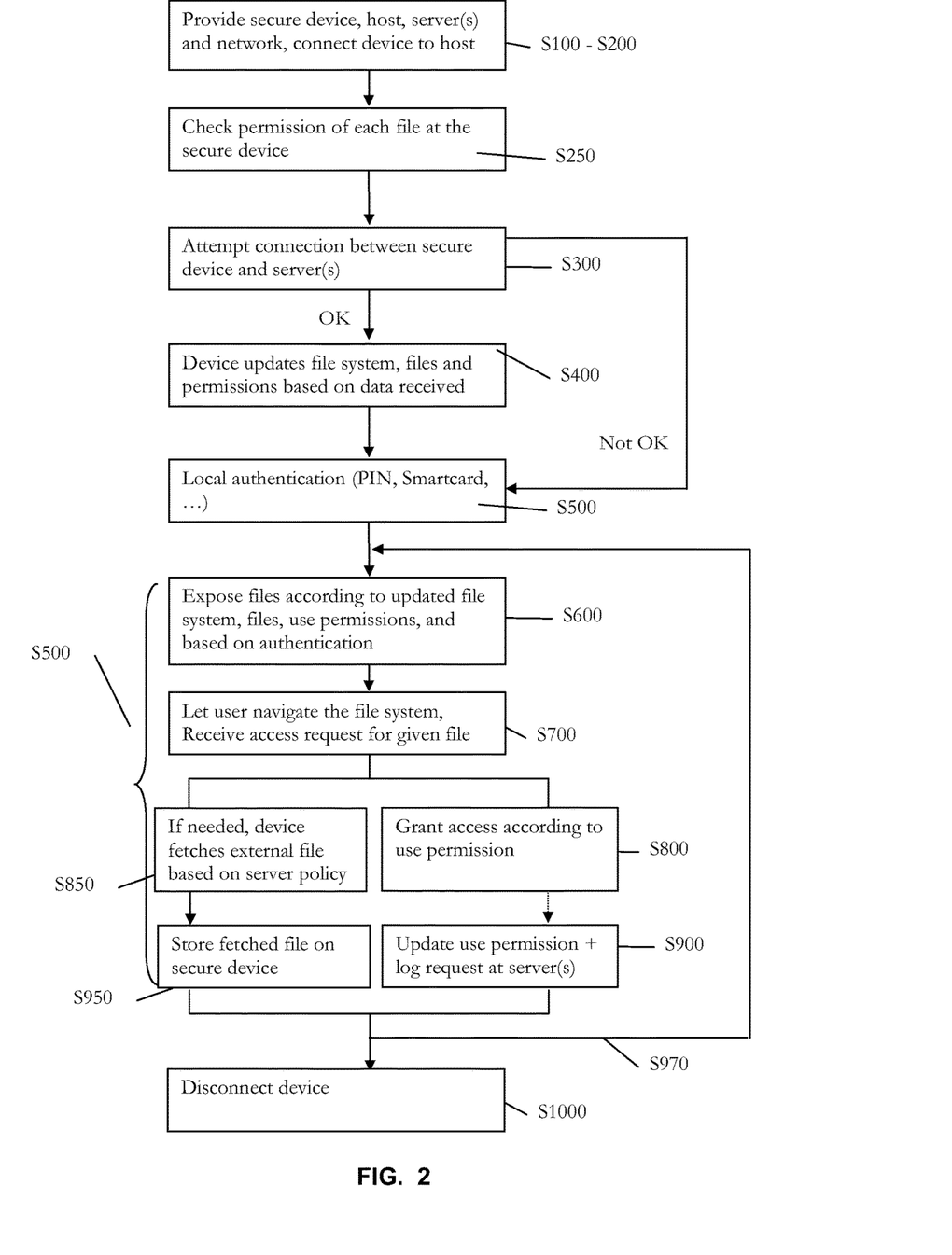
FIG. 2 is a flowchart depicting steps of a method according to another, more detailed embodiment.

Next, in reference to FIG. 2, another embodiment of the method of the present invention shall be described. It is understood that most variants already described in reference to FIG. 1 apply to the embodiment of FIG. 2 as well.

Here, steps S100, S200, S300, S400, S700, S800, S850, S900 and S950 essentially correspond to their counterpart steps in FIG. 1.

According to the embodiment of FIG. 2, the device preferably checks permission of each file (step 250) before actually attempting a connection to the server. Note that it is not mandatory to check permission before connecting to the server. It is however preferably done so, in order to allow the device to make any decision as to whether to expose the files or not to the PC (and even whether to list the presence of files).

Then, the device attempts to connect to the server, step S300. If the connection succeeds, the device updates file system, file and use permission data, step 400, as already described in reference to FIG. 1.

Next, the device may proceed to locally authenticate the user (e.g., by requiring the user to input a PIN, using a smart card or the like, as known per se), step S500. Note that if the previous attempt to connect to the server fails, the device would directly prompt the user to authenticate her(him)self, as depicted in FIG. 2. In a variant, the device may require the user to authenticate before actually attempting to create a connection to the server. In another variant, the user may be requested to manually enter a decryption key via the built-in buttons of the device.

The device then instructs (step S600) to expose the files according to the file system and use permission associated to files thereof, as recently updated at the device. Files are exposed such as to be navigable by the user, as explained earlier. Yet, files may be exposed to any application (even independently from exposing them to the user) following the same principle. Incidentally, whether to expose the files shall further depend on a success of the user authentication. Accordingly, a file may be prevented from being exposed if the corresponding permission does not allow it (e.g., no more use rights for this file). Thus, the user (or an external application) would not even "see" the file at stake, even if the user is locally correctly authenticated, which further reduces the risk of misuse or exposure to malware.

The next steps describe mechanisms for managing requests to access a file (S700). As before, distinct mechanisms are invoked, depending on whether:

The file is stored on the device: here the request is preferably processed (step S800) based on corresponding use permission. After processing the request, the permission is updated, if necessary (step S900); or The file is stored outside the device, whereby the request is processed (step S850) by e.g., instructing to fetch the requested file for subsequent storage (step S900).

As described earlier too, a connection established with the server may further allows for sending encryption keys, etc, from the server to the device, in addition to the file system data, files and file permissions. As further noted in reference to FIG. 1, different scenarios might be involved.

1) The secure device receives all necessary data from the server and via the host (or more exactly via the connection 91 relayed by the host), as discussed earlier.
2) In a variant, the file data (i.e., the documents) may be received from the host, i.e., a PC, but this, independently from the server.
3) In another variant, the secure device may receive given file data (i.e., the documents) from a terminal that differs from the host through which other types of data are received, and possibly at a different time. Here the terminal can for example be a PDA or mobile phone. The document may for instance be preliminary downloaded at the terminal through an Internet query. Provided an object identifier is available for that document and that the file system and permissions use a compatible object identifier formalism, then the core steps of the methods as described earlier can still be implemented.

4) Etc.

Figure 4:
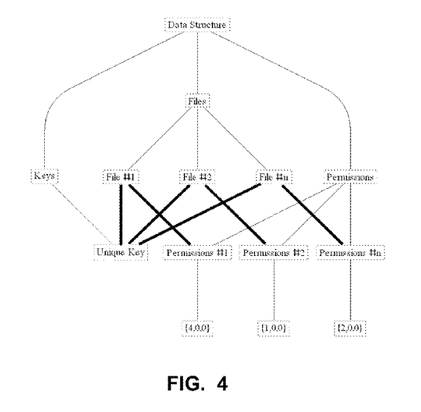
FIGS. 4 and 5 schematically depicts examples of data structures that show interrelations between use permissions and corresponding files as maintained in a device according to an embodiment of the invention.
Figure 5:
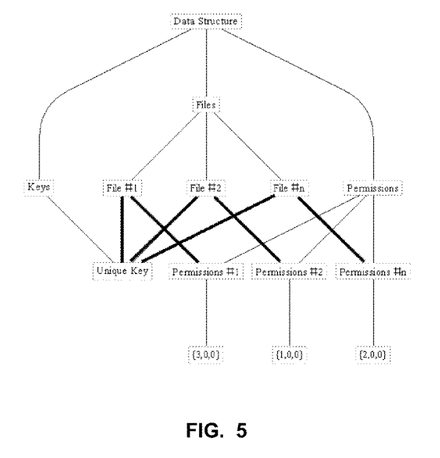

More shall be said now as to examples of data structures that can be implemented at the device, at least for those preferred embodiments where the device maintains and makes use of file permissions, and this, in reference to FIGS. 4 and 5. The layered graph plots represented in FIGS. 4 and 5 are schematic representations of data structures that can be stored on the secure device to implement such embodiments. In detail, the depicted data structures generally comprise:

Keys (for encrypting/decrypting files);
  Here a unique key "Unique Key" is involved, which allows to store the files in an encrypted state. Of course this key does not have to be unique for the whole device. It may further be present at file or directory level too.
Files (or file identifiers);
  Comprising the files #1 to n;
Permissions, the set of permissions comprising:
  Permissions #1 to n, i.e., one permission per file or even, one subset of permissions per file. In particular, a set $\{i, j, k\}$ of permissions might be associated to a file, as depicted here.

Here plain lines represent hierarchical relations in the data structure, whereas bold lines represent functional relationships between data, e.g., "File #1" is encrypted using "Unique Key" and is allowed to be accessed based on "Permission #1", the latter equal to $\{4, 0, 0\}$ in this example.

A set of permissions may consist of cardinalities $\{i, j, k, \ldots\}$, where $i, j, k, \ldots$ are associated to a respective action, i.e., each number represents the number of times a respective application is allowed to access a file. For example, "Permission #1" is equal to $\{4, 0, 0\}$ in FIG. 4, wherein 4, 0, 0 are for example respectively associated to applications requesting to access File #1: for (1) Displaying at the device;
(2) Displaying at an external output device; and
(3) Printing at an external printer.

Incidentally, since a given "Permission #n" is actually constituted by the corresponding set $\{i, j, k\}$ in this example, the hierarchical level corresponding to "Permission #1" to "Permission #n" is superfluous.

Thus, the example of data structure depicted in FIG. 4 notably means that the user may require File #1 to be displayed at the device only and only four times. Upon requesting to display File #1 (that is, step 700 in FIG. 1 or 2), the device would process the request by:

granting it (step 800);
decrypting the file (using the unique key necessary in this example), if necessary; and
instructing to display File #1.

Furthermore, the device shall update the corresponding permission (or accordingly inform the server for subsequent update) as the request has been granted. The set of permission is accordingly changed into $\{3, 0, 0\}$, indicating that the file is still available for display at the device, but only three times left, as seen in FIG. 5.

In a variant, Permission #n may consist of a set $\{t_1, t_2, t_3, \ldots\}$, where $t_1, t_2, t_3 \ldots$ correspond to lifetimes associated with File #n and with respective applications.

In another variant, Permission #n may consist of a set abc where each of a, b, or c can be r, w, x, or —, similar to UNIX permissions (rwx indicates that the user has read, write, execute permissions, - - - denotes no permission at all).

Note that if the permissions solely consist of lifetimes or r, w, x, or - permission, there is no need to update the permission after processing the request at the device. It is in this case sufficient for the device to rely on the permission data as maintained at and sent from the server, before processing the request.

In another variant, Permission #n could be represented by a subset $\{\{i, t_1\}, \{j, t_2\}, \{k, t_3\}, \ldots\}$, indicating that File #n can be accessed i times for display at the device and for a period $t_1$ only (or until date $t_1$), etc. In this case, a permission is updated, if necessary, after processing the request. Many other variations are possible, e.g., mixing occurrences, lifetime and r, w, x, or - permissions.

Nothing in this disclosure should be understood to preclude the use of alternative communications protocols (beyond USB) for loading and retrieving documents or document management credentials. In particular, it should be noted that the secure device might use a wireless interface such as Bluetooth to transfer documents for printing or use GPRS networks to request and retrieve document access credentials from the server application.

Moreover, a suitably equipped secure device shall be able to receive server-initiated document and/or credential removal commands without any user interaction in order to further strengthen the server's control over the data.

Computer program code required to implement at least parts of the above invention may be implemented in a high-level (e.g., procedural or object-oriented) programming language, or in assembly or machine language if desired; and in any case, the language may be a compiled or interpreted language. Suitable processors include general and special purpose microprocessors. Note that operations that the device, the terminal, the server or recipient performs may be stored on a computer program product tangibly embodied in a machine-readable storage device for execution by a programmable processor; and method steps of the invention may be performed by one or more programmable processors executing instructions to perform functions of the invention. In all cases, the present invention may encompass not only the secure device but a system including this device, augmented with one or more of the following: a terminal, at least one server or any suitable source and possibly an additional device such as a printer or a beamer, for communicating contents of the securely managed files.

More generally, the above invention may be implemented in digital electronic circuitry, or in computer hardware, firmware, software, or in combinations of them.

Generally, a processor will receive instructions and data from a read-only memory and/or a random access memory. Storage devices suitable for tangibly embodying computer program instructions and data include all forms of non-volatile storage, including by way of example semiconductor memory devices, such as EPROM, EEPROM, flash memory or others.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, the device may be configured such as to prevent connection to both the host and an external device at the same time. It may further be provided with a battery or powered by an external device. Furthermore, although the device preferably connects to a server via a host, it could have its own ability to communicate directly with said server, as evoked earlier. In such a case, some features of the preferred embodiments of the invention (i.e., connection occurring via a host) need be modified. Notably, step S200 in FIG. 1 becomes is optional. At step S600, updated files could be exposed thanks to built-in display capabilities, etc.

The invention claimed is:

1. A method for securely managing user access to a file system, comprising:
   providing a secure device comprising a Universal Serial Bus (USB) flash drive, wherein the secure device is adapted to establish a connection to a server;
   establishing the connection between the secure device and the server using a secure sockets layer (SSL)/transport layer security (TLS) authentication;
   receiving, at the secure device and through the established connection, a plurality of data pertaining to a virtual tree file system, wherein the virtual tree file system comprises a plurality of files which are stored outside the secure device;
   processing the user request at the secure device according to an updated use permission associated to an internal file, wherein the updated use permission is obtained at the secure device by updating a use permission based on permission data sent from the server through a connection established between the secure device and the server;
   exposing, at the secure device, the virtual tree file system to a user based on the data received from the server, wherein the virtual tree file system is navigable by the user;
   receiving a request for accessing a file in the virtual tree file system; wherein the file is fetched externally to the secure device from the server via the server according to a server policy;
   displaying to the user with a display of the secured device, the file in the virtual tree file system through the established connection, the file being presented on the display and not cached locally in the memory in the secured device; and
   receiving, at the secure device and through the established connection, updated data pertaining to an updated virtual tree file system comprising a plurality of files which are at least partly stored outside the secure device and partly stored inside the secure device; and
   exposing, at the secure device, the updated virtual tree file system to the user based on the updated data received from the server; wherein the updated virtual tree file system is navigable by the user;
   and wherein a file stored on a memory of the secure device, which is identified in a previously exposed file system and not identified in the updated file system, is removed from the memory of the secure device.

2. The method of claim 1, further comprising: after receiving at the secure device, a request for accessing an external file identified in the exposed virtual tree file system and stored outside the secure device, receiving, at the secure device, an external file through a connection established between the secure device and the server for subsequent storage on the secure device.

3. The method of claim 1, wherein the data pertaining to the virtual tree file system as received at the secure device and the corresponding virtual tree file system are user specific.

4. The method of claim 1, wherein the step of receiving data further comprises receiving data corresponding to one or more files identified in the corresponding virtual tree file system.

5. The method of claim 1 wherein: the files identified in the virtual tree file system, as exposed at the secure device, are stored on a plurality of servers; and said virtual tree file system, as exposed, is seamlessly navigable by the user.

6. The method of claim 1, further comprising: updating a use permission associated to the internal file upon granting the request for using the internal file.

7. The method of claim 6, wherein updating a use permission associated to the internal file is carried out at the secure device.

8. The method of claim 6, further comprising, after updating a use permission associated to the internal file, instructing, at the secure device, to expose the internal file to a user interface or an application according to said updated use permission.

9. The method of claim 1, wherein an updated use permission comprises a parameter, and wherein the parameter restricts access rights to the file when interpreted by the device processing a request for using the file.

10. A secure device protected by design against malicious software or malware and adapted to establish a connection with a server when the secure device is connected to the server through a telecommunication network, the secure device comprising:
    an interface communicatively coupled to said telecommunication network; a memory; and
    a processing means communicatively coupled to the memory, wherein the processing means is configured to perform the steps of a method comprising:
      establishing a connection between the secure device comprising a Universal Serial Bus (USB) flash drive and the server, wherein the secure device is adapted to establish the connection to the server using a secure sockets layer (SSL)/transport layer security (TLS) authentication, and to be a secure cache for the server;
      receiving, at the secure device and through the established connection, a plurality of data pertaining to a virtual tree file system, processing the user request at the secure device according to an updated use permission associated to an internal file, wherein the updated use permission is obtained at the secure device by updating a use permission based on permission data sent from the server through a connection established between the secure device and the server, wherein the virtual tree file system comprises a plurality of files which are at least partly stored outside the secure device;
      exposing, at the secure device, the virtual tree file system to a user based on the data received from the server, wherein the virtual tree file system is navigable by the user;
      receiving a request for accessing a file in the virtual tree file system; wherein the file is fetched externally to the secure device from the server via the server according to a server policy;
      displaying to the user with a display of the secured device, the file in the virtual tree file system through the established connection, the file being presented on the display and not cached locally in the memory in the secured device; and receiving, at the secure device and through the established connection, updated data pertaining to an updated virtual tree file system comprising a plurality of files which are at least partly stored outside the secure device and partly stored inside the secure device; and exposing, at the secure device, the updated virtual tree file system to the user based on the updated data received from the server; wherein the updated virtual tree file system is navigable by the user; and wherein a file stored on a memory of the secure device, which is identified in a previously exposed file system and not identified in the updated file system, is removed from the memory of the secure device.

11. A system for securely managing user access to a file system, comprising:

a personal computer (PC);

an at least one server; and a secure device comprising a Universal Serial Bus (USB) flash drive protected by design against malicious software or malware and adapted to establish a connection with the at least one server when the secure device is connected to the at least one server through a telecommunication network, the secure device comprising:

an interface communicatively coupled to said telecommunication network; a memory; and a processing means communicatively coupled to the memory, wherein the processing means is configured to perform the steps of a method comprising:

establishing a connection between the secure device and the at least one server, wherein the secure device is adapted to establish the connection to a server using a secure sockets layer (SSL)/transport layer security (TLS) authentication, and to be a secure cache for the server;

receiving, at the secure device and through the established connection, a plurality of data pertaining to a virtual tree file system, processing the user request at the secure device according to an updated use permission associated to an internal file, wherein the updated use permission is obtained at the secure device by updating a use permission based on permission data sent from the server through a connection established between the secure device and the server, wherein the virtual tree file system comprises a plurality of files which are at least partly stored outside the secure device;

exposing, at the secure device, the virtual tree file system to a user based on the data received from the at least one server, wherein the virtual tree file system is navigable by the user;

receiving a request for accessing a file in the virtual tree file system; wherein the file is fetched externally to the secure device from the server via the server according to a server policy;

displaying to the user with a display of the secured device, the file in the virtual tree file system through the established connection, the file being presented on the display and not cached locally in the memory in the secured device; and receiving, at the secure device and through the established connection, updated data pertaining to an updated virtual tree file system comprising a plurality of files which are at least partly stored outside the secure device and partly stored inside the secure device; and exposing, at the secure device, the updated virtual tree file system to the user based on the updated data received from the server; wherein the updated virtual tree file system is navigable by the user; and wherein a file stored on a memory of the secure device, which is identified in a previously exposed file system and not identified in the updated file system, is removed from the memory of the secure device.

12. A non-transitory computer readable storage medium tangibly embodying a computer readable program code having computer readable instructions which, when implement, cause a computer device to carry out the steps of a method for securely managing user access to a file system, the method comprising:

providing a secure device comprising a Universal Serial Bus (USB) flash drive, wherein the secure device is adapted to establish a connection to a server and to be a secure cache for the server;

establishing the connection between the secure device and the server using a secure sockets layer (SSL)/transport layer security (TLS) authentication;

receiving, at the secure device and through the established connection, a plurality of data pertaining to a virtual tree file system, processing the user request at the secure device according to an updated use permission associated to an internal file, wherein the updated use permission is obtained at the secure device by updating a use permission based on permission data sent from the server through a connection established between the secure device and the server, wherein the virtual tree file system comprises a plurality of files which are at least partly stored outside the secure device;

exposing, at the secure device, the virtual tree file system to a user based on the data received from the server, wherein the virtual tree file system is navigable by the user;

receiving a request for accessing a file in the virtual tree file system; wherein the file is fetched externally to the secure device from the server via the server according to a server policy;

displaying to the user with a display of the secured device, the file in the virtual tree file system through the established connection, the file being presented on the display and not cached locally in the memory in the secured device; and receiving, at the secure device and through the established connection, updated data pertaining to an updated virtual tree file system comprising a plurality of files which are at least partly stored outside the secure device and partly stored inside the secure device; and exposing, at the secure device, the updated virtual tree file system to the user based on the updated data received from the server; wherein the updated virtual tree file system is navigable by the user; and wherein a file stored on a memory of the secure device, which is identified in a previously exposed file system and not identified in the updated file system, is removed from the memory of the secure device.

13. The method of claim 1, further comprising: caching a file in the secure device.

14. The method according to claim 13, wherein caching the file is determined by the secure device or the server.

15. The method of claim 13, wherein content of the secure cache can change in response to a user interaction or a server decision.

16. The method of claim 13, further comprising: connecting the secure device to an external output, wherein the external output is selected from the group consisting of a beamer, a printer, a personal digital assistant (PDA), and a personal computer (PC).

17. The method of claim 1, further comprising: processing the request according to a use permission associated to the file, wherein: if the file is an external file, fetching the external file according to a server policy; and if the file is the internal file, fetching the internal file according to the use permission associated to the file.

\* \* \* \* \*